United States Patent
Li et al.

(10) Patent No.: US 10,425,836 B2
(45) Date of Patent: Sep. 24, 2019

(54) METHODS AND APPARATUSES FOR TRANSMITTING AND RECEIVING DATA

(71) Applicant: Telefonaktiebolaget LM Ericsson (publ), Stockholm (SE)

(72) Inventors: Gen Li, Beijing (CN); Cong Shi, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 15/575,951

(22) PCT Filed: Jun. 9, 2015

(86) PCT No.: PCT/CN2015/081040
§ 371 (c)(1),
(2) Date: Nov. 21, 2017

(87) PCT Pub. No.: WO2016/197315
PCT Pub. Date: Dec. 15, 2016

(65) Prior Publication Data
US 2018/0152851 A1 May 31, 2018

(51) Int. Cl.
*H04W 16/28* (2009.01)
*H04W 16/14* (2009.01)
(Continued)

(52) U.S. Cl.
CPC ......... *H04W 16/28* (2013.01); *H04L 41/0681* (2013.01); *H04W 16/06* (2013.01);
(Continued)

(58) Field of Classification Search
None
See application file for complete search history.

(56) References Cited

U.S. PATENT DOCUMENTS

| | | | | |
|---|---|---|---|---|
| 2002/0064167 A1* | 5/2002 | Khan | ............... | H04L 1/1819 370/410 |
| 2008/0161035 A1* | 7/2008 | Tomioka | ............... | H04W 16/14 455/550.1 |

(Continued)

FOREIGN PATENT DOCUMENTS

| | | |
|---|---|---|
| CN | 102651869 A | 8/2012 |
| CN | 103747450 A | 4/2014 |

(Continued)

OTHER PUBLICATIONS

ETSI, "Electromagnetic compatibility and Radio spectrum Matters (ERM); Wideband transmission systems; Data transmission equipment operating in the 2,4 GHz ISM band and using wide band modulation techniques; Harmonized EN covering the essential requirements (...)", ETSI EN 300 328 V1.8.1, Jun. 2012, 1-84.

*Primary Examiner* — James P Duffy
(74) *Attorney, Agent, or Firm* — Sage Patent Group (57) ABSTRACT

A method performed by a first communication apparatus for transmitting data to a second communication apparatus in a communication channel shared with a communication link including a third communication apparatus, wherein all of the first communication apparatus, the second communication apparatus and the third communication apparatus employing directional transmission, the method comprising: determining there is data to be transmitted to the second communication apparatus; and transmitting the data to the second communication apparatus before listening to the channel.

18 Claims, 7 Drawing Sheets

100

(51) Int. Cl.
*H04L 12/24* (2006.01)
*H04W 16/06* (2009.01)
*H04W 72/04* (2009.01)
*H04W 72/08* (2009.01)
*H04W 74/08* (2009.01)

(52) U.S. Cl.
CPC ....... *H04W 16/14* (2013.01); *H04W 72/0446* (2013.01); *H04W 72/082* (2013.01); *H04W 74/08* (2013.01); *H04W 72/046* (2013.01)

(56) References Cited

U.S. PATENT DOCUMENTS

2009/0204772 A1* 8/2009 Kolze ............... H03M 13/6505
711/157
2011/0038432 A1* 2/2011 Potkonjak ............. H04W 52/28
375/260

FOREIGN PATENT DOCUMENTS

| CN | 104333902 A | 2/2015 |
|----|-------------|--------|
| WO | 2009123420 A2 | 10/2009 |
| WO | 2009123420 A3 | 9/2011 |

\* cited by examiner

METHODS AND APPARATUSES FOR TRANSMITTING AND RECEIVING DATA

FIELD OF THE INVENTION

The disclosure relates to methods and apparatuses for transmitting and receiving data in a wireless communication system, and moreover, to methods and apparatuses for avoiding interference between communication links in a wireless communication system.

BACKGROUND OF THE INVENTION

As wireless communication systems have become ubiquitous, people have an increasing demand for high data rates (especially, up to 10 Gbps) to get a better user experience. Such high data rates require a very wide range of bandwidths which can only provided in a millimeter-wave band. This means a kind of wireless communication networks operating in the millimeter-wave band (hereinafter referred to 5G RAT networks) will appear and become more and more popular in the future. However, path loss in such 5G RAT networks is usually very serious due to high frequencies. Therefore, in order to mitigate the path loss, directional transmission (i.e. high-gain beamforming) realized with an antennas array is typically employed in communication apparatuses (e.g. Access Nodes, User Equipments) in the 5G RAT networks to transmit and/or receive data and/or instructions.

Besides traditional licensed exclusive millimeter-wave bands, 5G RAT networks are also expected to operate in unlicensed millimeter-wave bands which are usually shared between different links, operators, communication systems, and so on. In this case, a mechanism for sharing spectrum/channel is needed in the 5G RAT networks to avoid interference between different communication links.

Existing Wi-Fi wireless communication networks are based on IEEE 802.11 standards and generally employ a Listen Before Talk (hereinafter, referred to LBT) mechanism (e.g. a Carrier Sense Multiple Access with Collision Avoidance (CSMA/CA)) to enable spectrum/channel sharing. According to the LBT mechanism, if a communication apparatus is going to transmit data, it should at first listen to a shared channel to determine whether the shared channel is idle, and transmit data only when the shared channel is idle. The LBT mechanism works well in Wi-Fi wireless communication networks since communication apparatuses in these Wi-Fi wireless communication networks operate in low frequencies and typically employ omni or quasi-omni directional transmission to transmit and/or receive data and/or instructions. However, as mentioned above, 5G RAT networks operate in much higher frequencies and typically employ directional transmission to transmit and receive data and/or instructions which are different from Wi-Fi wireless communication networks. Therefore, the LBT mechanism might not work well in 5G RAT networks.

SUMMARY OF THE INVENTION

On consideration of whether the LBT mechanism could apply to 5G RAT networks, the inventors realize some problems which rarely occur in Wi-Fi wireless communication networks using the LBT mechanism, while might frequently occur in 5G RAT operating on high frequency bands using the same LBT mechanism.

Figure 1:
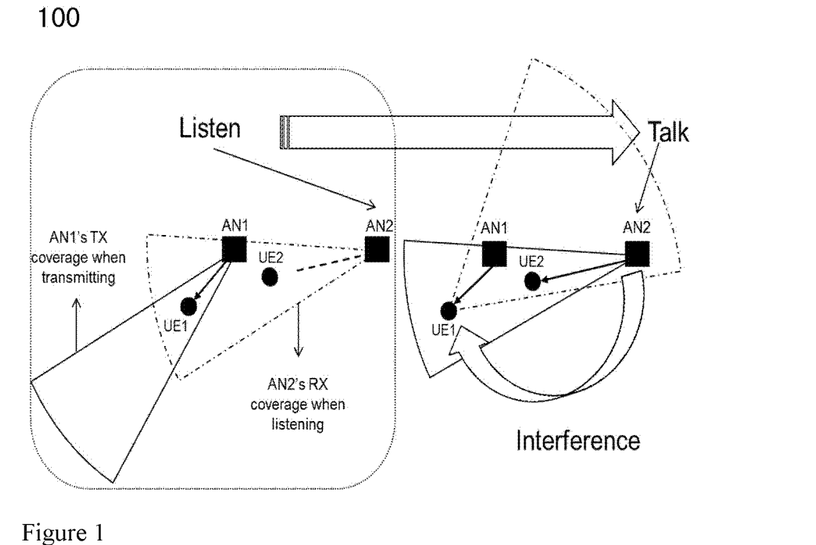

A hidden node problem refers to a problem that when a first communication apparatus included in a first communication link for transmitting data is going to transmit data in a shared channel to a second communication apparatus included in the first communication link, it can not hear a second communication link being transmitting data in the shared channel; but if it then starts transmitting data to the second communication apparatus, there will be interference. FIG. 1 schematically illustrates an example scenario 100 in a 5G RAT network in which a hidden node problem occurs if a LBT mechanism is used. In FIG. 1, Access Nodes (hereinafter referred to AN) AN1, AN2 are examples of communication apparatuses for transmitting data and User Equipments (hereinafter referred to UE) UE1, UE2 are examples of communication apparatuses for receiving data, all of which employ directional transmission, e.g. high gain beamforming. AN1 and AN2 are in the receiving (hereinafter, referred to RX) coverage (shown as sectors in FIG. 1) of UE1 and UE2 respectively, and UE1 and UE2 are in the transmitting (hereinafter, referred to TX) coverage (shown as sectors in FIG. 1) of AN1 and AN2 respectively. Therefore, UE1 is able to receive data from AN1 and UE2 is able to receive data from AN2. In FIG. 1, it is shown at the left side a listen phase of AN2, and at the right side a talk phase of AN2. As shown at the left side of FIG. 1, AN1 is currently transmitting data to UE1 while AN2 is listening. In this case, since AN2 is not in the TX coverage of AN1 as shown in FIG. 1, even though AN1 is in the RX coverage of AN2, AN2 can not hear AN1 being transmitting data to UE1 and thus considers a channel shared with a communication link between AN1 and UE1 is available. Therefore, in the next phase (i.e. the talk phase), as shown at the right side of FIG. 1, AN2 starts transmitting data to UE2. In this case, however, since AN2 is in the RX coverage of UE1 and UE1 is in the TX coverage of AN2, UE1 is interfered by AN2's transmission to UE2. Obviously, a hidden node problem occurs in such a situation. This is not desirable since it will result in transmission failures due to interference.

Moreover, it is realized that, compared to Wi-Fi networks, the hidden node problem occurs much more frequently in 5G RAT networks due to high gain beamforming and narrow beam width. Therefore, a new mechanism is needed in 5G RAT networks to solve this problem.

Figure 2:
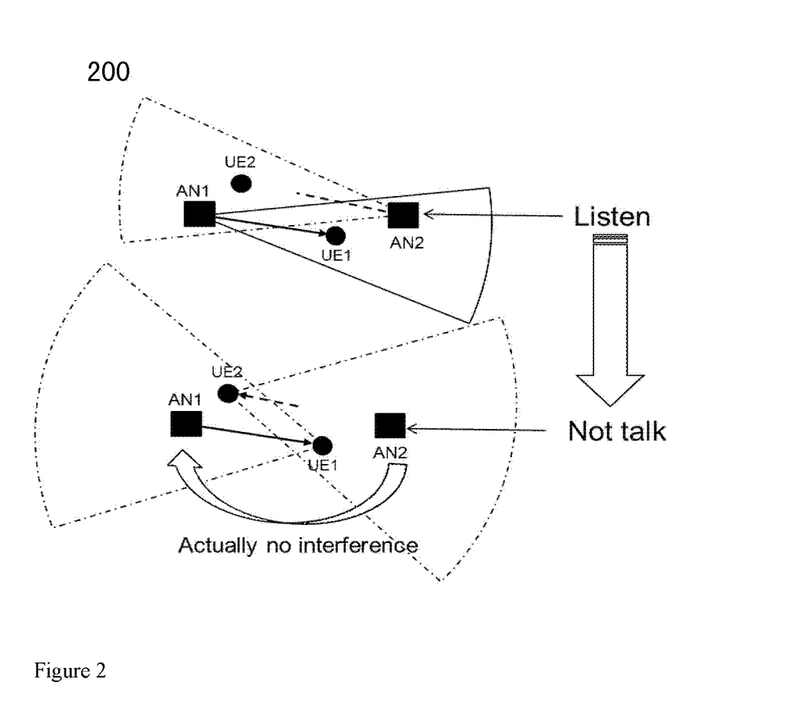
FIG. 2 schematically illustrates an example scenario in a 5G RAT network in which an exposed node problem occurs if a LBT mechanism is used.

In opposite to the hidden node problem, an exposed node problem refers to a problem that when a first communication apparatus included in a first communication link for transmitting data is going to transmit data in a shared channel to a second communication apparatus included in the first communication link, it can hear a second communication link being transmitting data in the shared channel and thus wait until the shared channel is idle; but if it starts transmitting data to the second communication apparatus at that time, there will actually be no interference. FIG. 2 schematically illustrates an example scenario 200 in a 5G RAT network in which an exposed node problem occurs if a LBT mechanism is used. AN1, AN2, UE1 and UE2 of FIG. 2 are basically the same as those of FIG. 1 except their positions and coverage. In FIG. 2, it is shown at the top a listen phase of AN2, and at the bottom a talk phase of AN2. As shown at the top of FIG. 2, AN1 is currently transmitting data to UE1 while AN2 is listening. In this case, since AN2 is in the TX coverage of AN1, and AN1 is in the RX coverage of AN2, AN2 can hear AN1 being transmitting data and thus considers a communication channel shared with a communication link between AN1 and UE1 is unavailable. Therefore, in the next phase (i.e. the talk phase), as shown at the bottom of FIG. 2, AN2 would just wait without talk. However, as shown at the bottom of FIG. 2, since AN2 is not in the RX coverage of UE1 and AN1 is not in the RX coverage of UE2, a communication link between AN1 and UE1 (e.g. data transmission from AN1 to UE1) and a communication link between AN2 and UE2 (e.g. data transmission from AN2 to UE2) will actually not interfere with each other. In such a situation, an exposed node problem occurs. This is not desirable since it will result in throughput loss due to low spatial reuse.

It is realized that, compared to Wi-Fi networks, the exposed node problem occurs much more frequently in 5G RAT networks, which will significantly reduce spatial reuse. Therefore, a new mechanism is also needed in 5G RAT networks to solve this problem.

Accordingly, the disclosure seeks to preferably mitigate, alleviate or eliminate one or more of the above mentioned disadvantages singly or in any combination.

The inventors have realized that in practice, interference occurs much less frequently in 5G RAT networks than in Wi-Fi networks, and thus there is much less need in 5G RAT networks for a mechanism mainly used for avoiding interference (e.g. a LBT mechanism). With respect to Wi-Fi networks, the reason for a mechanism mainly for avoiding interference is that, it is shown that in Wi-Fi networks, almost 90% cases have interference when two communication apparatuses for transmitting data (e.g. Access Nodes) become close to each other. This means, in most cases, communication apparatuses in Wi-Fi networks have to solve the interference problem in order to communicate. Therefore, a LBT mechanism is good choice for Wi-Fi networks. However, with respect to 5G RAT networks, due to directional transmission and narrow beam width, interference between communication links rarely occurs. To some extend, the narrower the beam width, the less possibility interference may occur. In fact, interference only occurs when two communications apparatus (e.g. Access Nodes) become very close to each other. In an extreme case in which an AN with a beam width of 30 degree and a User Equipment with a beam width of 60 degree are 5 meters apart, a probability of interference is only about 1%. This means, in most cases of 5G RAT networks, if a communication apparatus is going to transmit data, there is no need for the communication apparatus to first listen to a shared channel to determine whether the shared channel is idle since interference rarely occurs in 5G RAT networks. The inventors realize that even if a plurality links in a 5G RAT network transmit data at the same time without the LBT mechanism to avoid interference, interference rarely occurs among them.

Based on the above realization, the disclosure proposes a Listen After Talk (hereinafter, referred to LAT) mechanism to preferably mitigate, alleviate or eliminate one or more of the above mentioned disadvantages. The main idea of the LAT mechanism is that when a communication apparatus needs to transmit data, it can directly transmit the data without listening to a shared channel, and later, only when interference is determined, start solving the interference. Through the LAT mechanism, spatial reuse is highly improved in 5G RAT networks as a whole.

According to an aspect of the disclosure there is provided a method performed by a first communication apparatus for transmitting data to a second communication apparatus in a communication channel shared with a communication link including a third communication apparatus, wherein all of the first communication apparatus, the second communication apparatus and the third communication apparatus employing directional transmission, the method comprising: determining there is data to be transmitted to the second communication apparatus; and transmitting the data to the second communication apparatus before listening to the channel.

According to an aspect of the disclosure there is provided a method performed by a second communication apparatus for receiving data from a first communication apparatus in a channel shared with a communication link including a third communication apparatus, wherein all of the first communication apparatus, the second communication apparatus and the third communication apparatus employing directional transmission, the method comprising: receiving the data from the first communication apparatus; determining whether the data transmission between the first communication apparatus and the second communication apparatus is interfered; and if interference is determined, then listening to the channel to avoid interference in receiving the data from the first communication apparatus.

According to an aspect of the disclosure there is provided a first communication apparatus for transmitting data to a second communication apparatus in a communication channel shared with a communication link including a third communication apparatus, wherein all of the first communication apparatus, the second communication apparatus and the third communication apparatus employing directional transmission, the first communication apparatus comprising: a determining unit adapted to determine there is data to be transmitted to the second communication apparatus; and a transmitting unit adapted to transmit the data to the second communication apparatus before listening to the channel.

According to an aspect of the disclosure there is provided a second communication apparatus for receiving data from a first communication apparatus in a channel shared with a communication link including a third communication apparatus, wherein all of the first communication apparatus, the second communication apparatus and the third communication apparatus employing directional transmission, the second communication apparatus comprising: a receiving unit adapted to receive the data from the first communication apparatus; a determining unit adapted to determine whether the data transmission between the first communication apparatus and the second communication apparatus is interfered; and a listening unit adapted to, if interference is determined, then listen to the channel to avoid interference in receiving the data from the first communication apparatus.

According to an aspect of the disclosure there is provided a first communication apparatus for transmitting data to a second communication apparatus in a communication channel shared with a communication link including a third communication apparatus, wherein all of the first communication apparatus, the second communication apparatus and the third communication apparatus employing directional transmission, the first communication apparatus comprising a processor and memory, said memory comprising indications that, when executed by said processor, causes the communication apparatus to: determine there is data to be transmitted to the second communication apparatus; and transmit the data to the second communication apparatus before listening to the channel.

According to an aspect of the disclosure there is provided a second communication apparatus for receiving data from a first communication apparatus in a channel shared with a communication link including a third communication apparatus, wherein all of the first communication apparatus, the second communication apparatus and the third communication apparatus employing directional transmission, the first communication apparatus comprising a processor and memory, said memory comprising indications that, when executed by said processor, causes the communication apparatus to: receive the data from the first communication apparatus; determine whether the data transmission between the first communication apparatus and the second communication apparatus is interfered; and if interference is determined, listen to the channel to avoid interference in receiving the data from the first communication apparatus.

According to an aspect of the disclosure there is provided a computer readable storage medium, having stored thereon a computer program comprising computer program code means adapted to perform all the steps of anyone of the above-mentioned methods when the computer program is run on a computer.

According to an aspect of the disclosure there is provided a computer readable storage medium, having stored thereon a computer program comprising computer program code means adapted to perform all the steps of anyone of the above-mentioned methods when the computer program is run on a computer.

These and other aspects, features and advantages of the disclosure will be apparent from and elucidated with reference to the embodiment(s) described hereinafter.

BRIEF DESCRIPTION OF THE DRAWINGS

Embodiments of the disclosure will be described, by way of example only, with reference to the drawings, in which FIG. 1 schematically illustrates an example scenario in a 5G RAT network in which a hidden node problem occurs if a LBT mechanism is used.

DETAILED DESCRIPTION OF SOME EMBODIMENTS OF THE INVENTION

According to the disclosure, a first communication apparatus generally refers to a communication apparatus for mainly transmitting data, a second communication apparatus generally refers to a communication apparatus for mainly receiving data, unless other specified.

Figure 3:
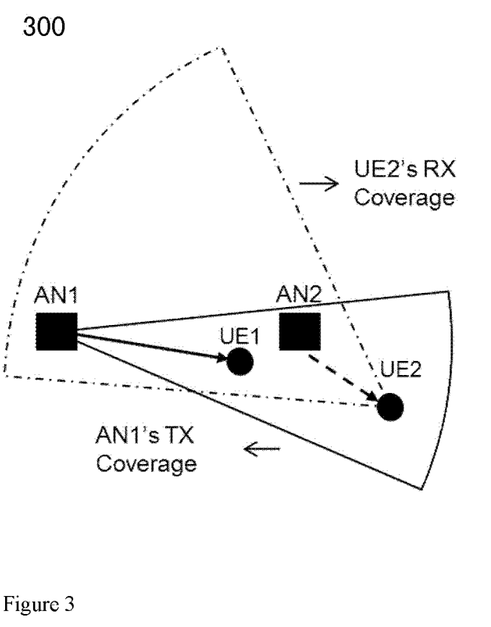
FIG. 3 schematically illustrates an example 5G RAT network according to an embodiment of the disclosure.

FIG. 3 schematically illustrates an example of 5G RAT network 300 according to an embodiment of the disclosure. 5G RAT network 300 is a wireless network operating in a millimeter-wave band.

In the illustrated example, the 5G RAT network 300 comprises two communication links being comprised of two first communication apparatuses for transmitting data in forms of Access Nodes AN1 and AN2 and two second communication apparatuses for receiving data in forms of User Equipments UE1 and UE2, i.e. a first communication link between AN1 and UE1 and a second communication link between AN2 and UE2. AN1 transmits data to UE1 via the first communication link and AN2 transmits data to UE2 via the second communication link. In other embodiments, the 5G RAT network 300 may comprise three or more communication links.

Both of the first communication apparatuses and the second communication apparatuses employ directional transmission realized with e.g. an antenna array, and thus have a sector TX coverage and RX coverage. As described above, in a 5G RAT network, if a first communication apparatus is going to transmit data to a second communication apparatus via a communication link between them, then the first communication apparatus should be in the RX coverage of the second communication apparatus and the second communication apparatus should meanwhile be in the TX coverage of the first communication apparatus. In illustrated example in FIG. 3, AN1 has a sector TX coverage and UE1 has a sector RX coverage (not shown). If AN1 is going to transmit data to UE1 via the first communication link, then AN1 must be in the RX coverage of UE1 and UE1 must be in the TX coverage of AN1. This equally applies to AN2 and UE2.

Examples in this disclosure are discussing communication links which are assumed to operate in a same channel or carrier (i.e. communication links in the 5G RAT network share the same channel or carrier to communicate data) in the 5G RAT network. In the illustrated example, AN1, AN2, UE1 and UE2 operate in a same channel or carrier, which means the first communication link between AN1 and UE1 shares the same channel or carrier with the second communication link between AN2 and UE2.

Due to sharing, interference may occur when communication links works at the same time. In illustrated example in FIG. 3, since AN1 is in the RX coverage of UE2 and UE2 is in the TX coverage of AN1, UE2 will be interfered by AN1 transmitting data to UE1 when AN2 is transmitting data to UE2 at the same time. Although FIG. 3 only illustrates the second communication link being interfered by the first communication link, it can be contemplated that other interference cases may occur, for example, the first communication link is interfered by the second communication link, the second communication link and the first communication link interfere with each other due to overlapping of RX range and TX range of different links.

In illustrated examples, the first communication apparatuses for transmitting data are shown as Access Nodes AN1 and AN2. In other examples, the first communication apparatuses for transmitting data may be User Equipments or other communication apparatuses which can transmit data with directional transmission. Similarly, although the second communication apparatuses for receiving data are shown as User Equipments UE1 and UE2 in FIG. 3, the second communication apparatuses for receiving data may be Access Nodes or other communication apparatuses which can receive data with directional transmission.

Figure 4:
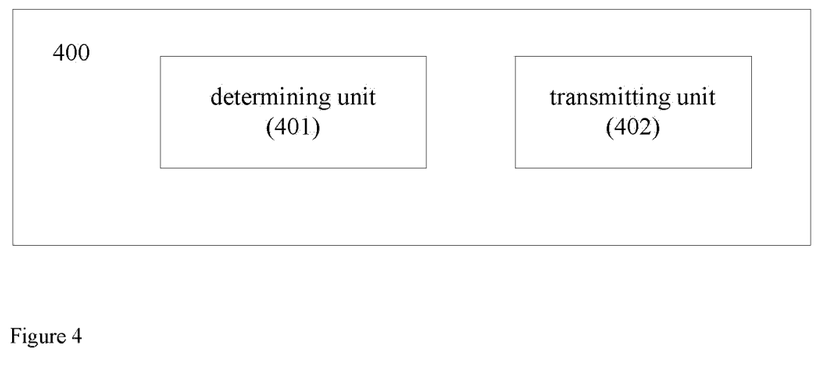
FIG. 4 schematically illustrates a block diagram of a first communication apparatus for transmitting data according to an embodiment of the disclosure.

FIG. 4 schematically illustrates a block diagram of a first communication apparatus 400 for transmitting data according to an embodiment of the disclosure. The first communication apparatus 400 is adapted to transmit data to a second communication apparatus in a communication channel shared with another communication link including a third communication apparatus. The first communication apparatus 400 employs directional transmission (i.e. high gain beamforming) realized with e.g. an antenna array. The first communication apparatus 400 may be for example a base station, mobile phone, handheld computer, and so on.

As shown in FIG. 4, the first communication apparatus 400 comprises a determining unit 401 adapted to determine there is data to be transmitted to the second communication apparatus and a transmitting unit 402 adapted to transmit the data to the second communication apparatus before listening to the channel.

The determining unit 401 can be adapted to determine there is data to be transmitted to the second communication apparatus based on various cases. In an embodiment, when the first communication apparatus 400 itself is going to transmit data to the second communication apparatus, then the determining unit 401 may know this need and thus determine there is data to be transmit to the second communication apparatus. In another embodiment, the first communication apparatus 400 as an intermediate may need to forward data or instructions received from another communication apparatus to the second communication apparatus. Therefore, when data or instructions arrive at the first communication apparatus 400, the determining unit 401 may determine there is data to be transmitted to the second communication apparatus.

In an embodiment, the determining unit 401 is further adapted to notify the transmitting unit 402 of its determination result, for example by sending an indication, etc. For example, the determining unit 401 can send an indication to notify the transmitting unit 402 that there is data need to be transmitted. Further, size of the data to be transmitted may also be notified. According to the disclosure, other notifying ways can be contemplated.

After receiving e.g. an indication from the determining unit 401, the transmitting unit 402 may be adapted to transmit the data to the second communication apparatus before listening. For example, the transmitting unit 402 can directly transmit data to other communication apparatuses without listening to a shared channel for determining whether the shared channel is idle, if it needs to transmit data. With respect to the whole 5G RAT network, this can save system resources and improve efficiency as a whole since interference rarely occurs and listening is not necessary before transmitting data. However, it is to be realized that there are a lot of ways to implement data transmitting which are not described in detail herein.

Before further discussing the transmitting unit 402, some definitions according to the disclosure should be described first.

According to the disclosure, performing a data transmission is defined as performing at least one data transmission unit. In an embodiment, a number of data transmission units involved in a data transmission can be directly specified by a communication apparatus itself or negotiated between communication apparatuses. For example, a first communication apparatus can specify on its own that or negotiate with another communication apparatus that a data transmission comprises three data transmission units. Then, performing a data transmission comprises performing three data transmission units.

In an embodiment, a number of data transmission units involved in a data transmission may be fixed or varied. For example, in the case of that a first communication apparatus needs to perform three data transmissions to completely transmit data to a second communication apparatus, the three data transmissions can respectively comprise for example, 3, 3 and 3 data transmission units (if fixed) or 1, 2 and 3 data transmission units (if varied).

In an embodiment, a number of data transmission units involved in a data transmission can be indirectly specified by e.g. setting a timer. For example, when performing a data transmission is started, the transmitting unit 402 triggers a timer and begins to perform a first data transmission unit. After the first data transmission unit is performed, the transmitting unit 402 can check whether the timer expires. If it is determined that the timer expires, the transmitting unit 402 can stop performing the data transmission; otherwise, the transmitting unit 402 performs a next data transmission unit and then check the timer again. Next, the transmitting unit 402 repeats the above operations until the timer expires. In this case, the number of data transmission units involved in a data transmission depends on the timer.

According to an embodiment, performing each data transmission unit by a first communication apparatus comprises: a first communication apparatus (e.g. the transmitting unit 402 of the first communication apparatus) transmits a data unit to a second communication apparatus and receives a feedback from the second communication apparatus. In other words, according to the disclosure, performing each data transmission unit comprises two operations, i.e. transmitting and receiving, which means, only when a data transmission unit ends up, another data transmission unit can be started.

According to the disclosure, a data unit may comprise a data header which may among other things include control information indicating e.g. an identifier of a first communication apparatus for transmitting data, an identifier of a second communication apparatus for receiving data, time information about transmission, and so on. In an embodiment, a data header may comprise e.g. a number of data transmission units included in a data transmission, so that other communication apparatuses may know when a first communication apparatus transmitting this data header will enter an idle state, in order to try to transmit data by themselves when the first communication apparatus is in the idle state. In an embodiment, a data header may further comprise time length of an idle state, so that other communication apparatuses may know when a first communication apparatus transmitting this data header will end the idle state to perform another data transmission. It is to be realized that the data header can comprise any information depending on the circumstances.

Optionally, a data unit can further comprise data payload. The transmitting unit 402 may include data payload in the data unit need to be transmitted to a second communication apparatus. It is to be realized that the data payload can be any types of data.

In an embodiment, a feedback received from a second communication apparatus may among other things comprise information or indication indicating e.g. success of transmission, or failure of transmission. It is to be realized that the feedback can comprise any information depending on the circumstances.

Now turn to the transmitting unit 402. As described above, interference rarely occurs in 5G RAT networks. In an embodiment, the transmitting unit 402 is thus adapted to repeatedly perform the following steps until data need to be transmitted is completely transmitted to the second communication apparatus: performing a data transmission; and entering an idle state. This typically happens when different communication links do not interfere with each other.

Figure 6:
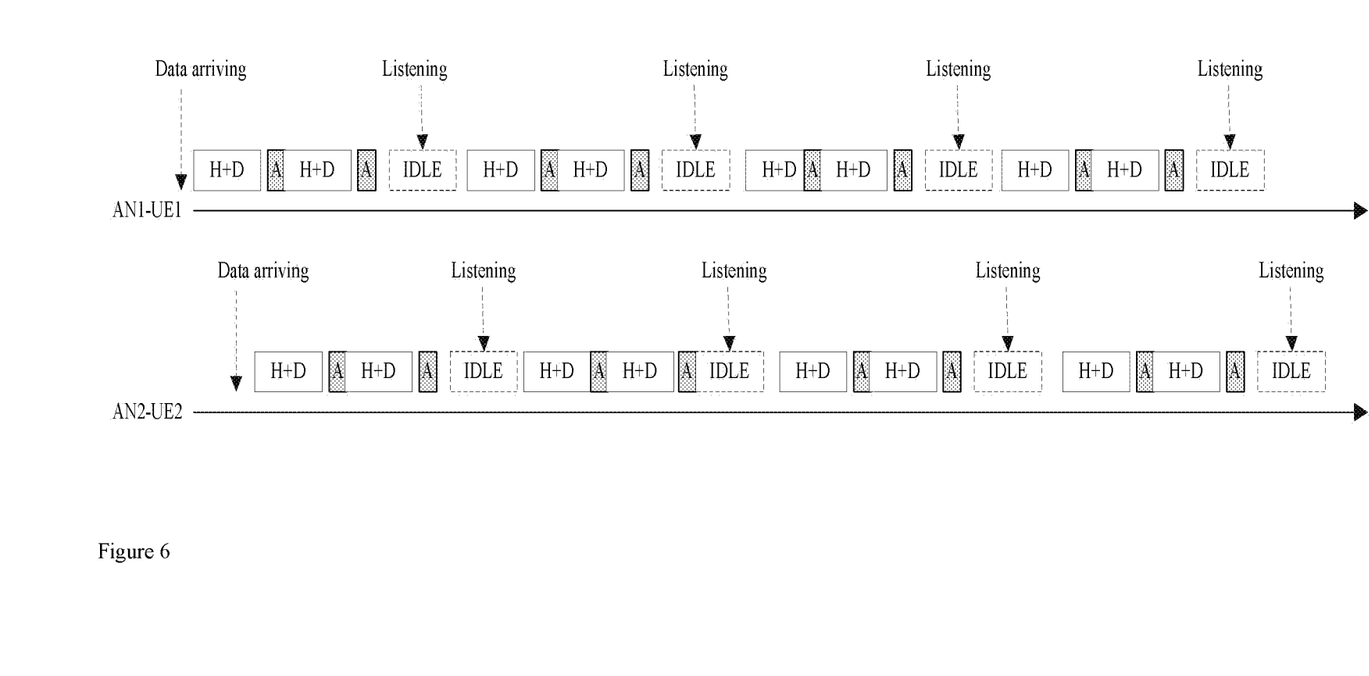
FIG. 6 schematically illustrates a timing chart of two communication links according to an embodiment of the disclosure.

FIG. 6 schematically illustrates a timing chart of two communication links according to an embodiment of the disclosure in which the two communication links do not interfere with each other. In FIG. 6, AN1 and AN2 represent different first communication apparatuses for transmitting data; UE1 and UE2 represent different second communication apparatuses for receiving data; AN represents a first communication link in which AN1 transmits data to UE1; AN2-UE2 represents a second communication link in which AN2 transmits data to UE2; H+D represents a data unit comprising a data header and a data payload; A represents a feedback from a second communication apparatus; IDLE represents an idle state; a block without pattern represents information in the block being transmitted by a first communication apparatus for transmitting data; and a block with shade represents information in the block transmitted from a second communication apparatus for receiving data. As shown in FIG. 6, since the two communication links (i.e. AN and AN2-UE2) do not interfere with each other, AN1 is repeated between performing a data transmission and entering an idle state, and AN2 is also repeated between performing a data transmission and entering an idle state, until data need to be transmitted is completed transmitted. Although, for simplicity, FIG. 6 only illustrates two data transmission units being performed in each data transmission, as described above, more or less data transmission units can be performed in each data transmission depending on different circumstances.

Additionally, although interference rarely occurs in 5G RAT networks, there is indeed interference in some cases as described foregoing. Therefore, a mechanism for avoiding interference is also needed in 5G RAT networks. According to the disclosure, when a first communication apparatus for transmitting data has data to transmit, it first transmits data without listening. Only when it is determined later the existence of interference, the first communication apparatus stops transmitting and then listens to a shared channel for a transmitting indication in order to continue transmitting of data.

Turn to FIG. 4 again. In an embodiment, the transmitting unit 402 is thus adapted to perform a data transmission; and if interference is determined during the data transmission, stop the data transmission and listen to the shared channel for a transmitting indication in order to continue transmitting data to the second communication apparatus. This usually happens when there is interference between communication links.

Additionally, in an embodiment, the transmitting unit 402 can be further adapted to, if during the listening, a transmitting indication from the second communication apparatus indicating transmitting of data will be performed is received, then perform another data transmission; and if no interference is determined during the other data transmission, enter an idle state. In particular, when the transmitting indication indicating transmitting of data will be performed is received from the second communication apparatus, the first communication apparatus knows that the second communication apparatus notifies or instructs it to perform a data transmission in a closely following time slot indicated in the transmitting indication, and thus perform the data transmission in the closely following time slot. If, during the data transmission, there is no interference, the first communication apparatus enters an idle state after the data transmission is completed.

Additionally, in an embodiment, the transmitting unit 402 can be further adapted to, if during the listening, a transmitting indication from the second communication apparatus indicating transmitting of data from the first communication apparatus to the second communication apparatus will be delayed is received, then delay transmitting of data from the first communication apparatus to the second communication apparatus according to a time slot indicated in the transmitting indication, send another transmitting indication indicating transmitting of data will be performed, perform another data transmission, and if no interference is determined during the other data transmission, enter an idle state.

In particular, according to an embodiment of the disclosure, a first communication apparatus for transmitting data to a second communication apparatus can listen to a shared channel when it is in an idle state. In this case, according to an embodiment of the disclosure, when the first communication apparatus is e.g. in an idle state, it (i.e. the transmitting unit 402 of the first communication apparatus) likely receives indications or instructions, such as a transmitting indication from the second communication apparatus indicating transmitting of data from the first communication apparatus to the second communication apparatus will be delayed, which is typically sent by the second communication apparatus to notify or instruct the first communication apparatus not to perform a data transmission in a closely following time slot, after the second communication apparatus knows the shared channel will be occupied by another communication link in the closely following time slot, e.g. by receiving, from a third communication apparatus included in the other communication link, another transmitting indication indicating transmitting of data will be performed. After receiving the transmitting indication, the first communication apparatus will know the closely following time slot indicated in the transmitting indication will be used by the other communication link, and thus delay (i.e. not to perform) its data transmission according to a time slot (i.e. the closely following time slot) indicated in the transmitting indication during which the first communication apparatus would perform a data transmission if such a transmitting indication were not received or there were no interference. Once the other communication link performs a data transmission and later enters an idle state according to the disclosure (which means the shared channel is not used by the other communication link at that time), the first communication apparatus terminates the delaying operation and sends another transmitting indication indicating transmitting of data will be performed, to notify the second communication apparatus or other communication apparatuses that it will occupy the shared channel in a closely following time slot, so that other communication links will know not to occupy the shared channel in the closely following time slot, and thus interference is avoided. Next, the first communication apparatus will perform a data transmission in this closely following time slot indicated in the other transmitting indication. After the data transmission is performed by the first communication apparatus, the first communication apparatus will enter an idle state so that the other communication links can try to occupy the shared channel again. According to the above, the communication link between the first communication apparatus and the second communication apparatus and the other communication link will alternately occupy the shared channel until their data is completely transmitted.

Additionally, in an embodiment, the transmitting unit is further adapted to: perform a data transmission; enter an idle state; and if during the idle state, a transmitting indication from the third communication apparatus indicating transmitting of data will be performed or a transmitting indication from the second communication apparatus indicating transmitting of data from the first communication apparatus to the second communication apparatus will be delayed is received, then as described above, delay transmitting data to the second communication apparatus according to a time slot indicated in the transmitting indication, send another transmitting indication indicating transmitting of data will be performed, perform another data transmission, and if no interference is determined during the other data transmission, then enter an idle state.

Based at least partly on the above operations of a first communication apparatus, interference will be avoided if occurs.

Figure 7:
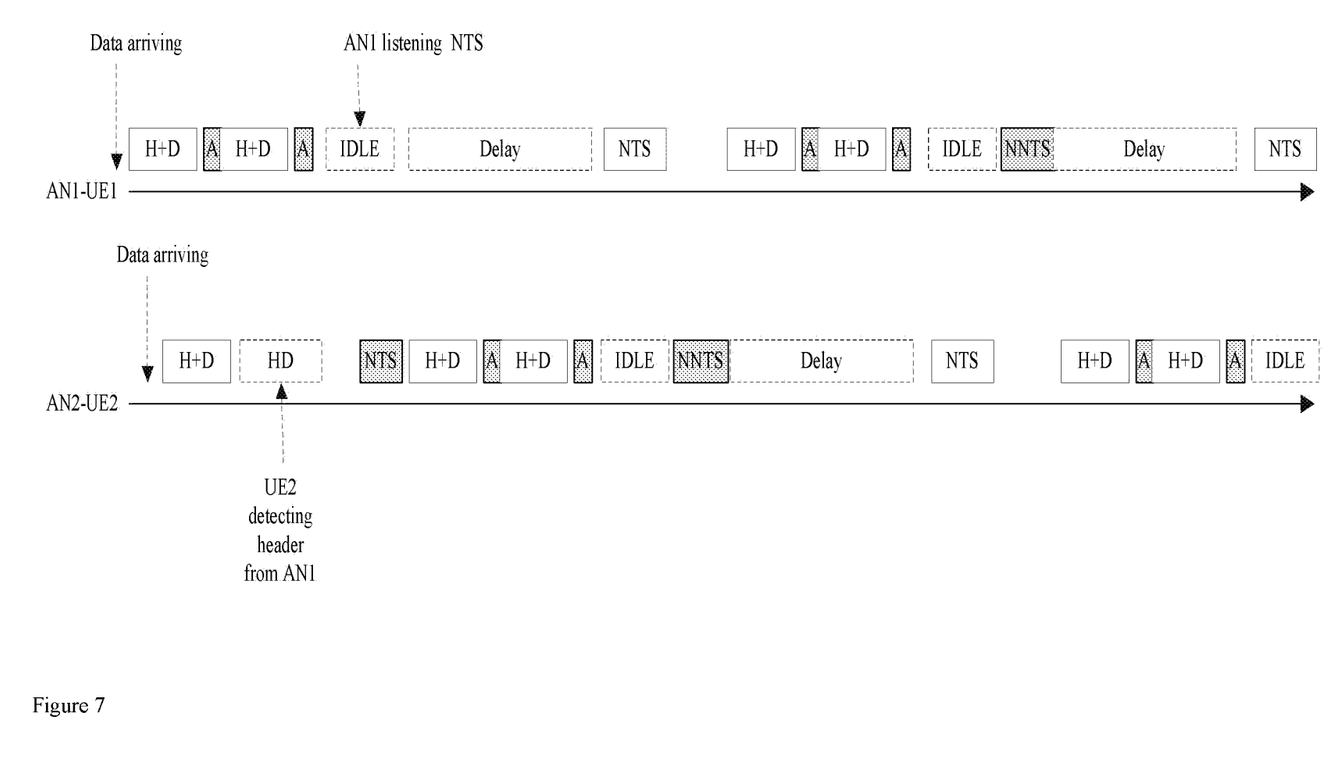
FIG. 7 schematically illustrates a timing chart of two communication links according to an embodiment of the disclosure.
Figure 8:
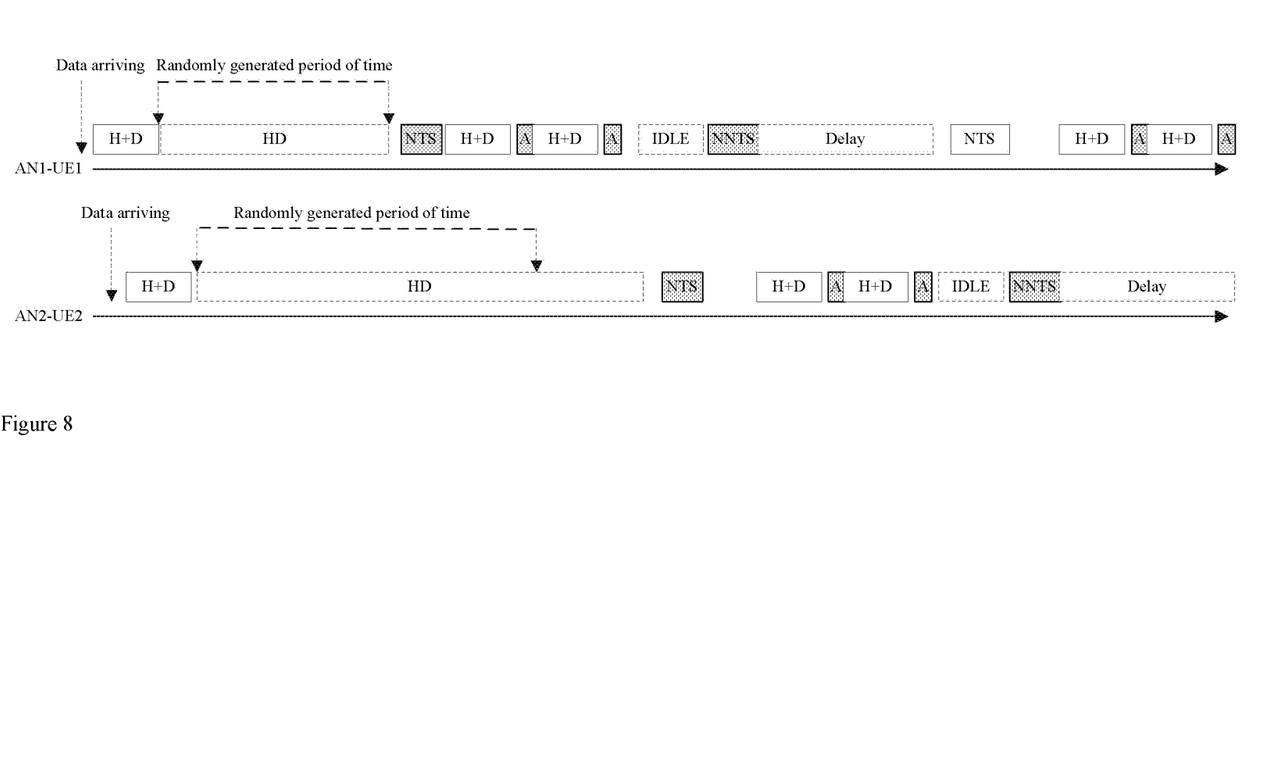
FIG. 8 schematically illustrates a timing chart of two communication links according to an embodiment of the disclosure.

FIGS. 7 and 8 give examples of operations of a first communication apparatus for transmitting data (i.e. a transmitting unit 402 included in the first communication apparatus) if there is interference.

FIGS. 7 and 8 schematically illustrate timing charts of two communication links according to embodiments of the disclosure respectively. FIG. 7 illustrates a situation in which one (e.g. AN2-UE2 in FIG. 7) of the two communication links is interfered by the other, and FIG. 8 illustrates a situation in which both of the two communication links are interfered by each other. In addition to the same definitions of terms as those of FIG. 6, FIGS. 7 and 8 comprise a transmitting indication NTS (Notify-To-Send) representing that transmitting of data will be performed, a transmitting indication NNTS (Notify-Not-To-Send) representing that transmitting of data from a transmitter to a receiver will be delayed, HD representing a time slot for receiving a data header from a first communication apparatus in the other communication link, and Delay representing a time slot for waiting for another data transmission. It is to be understood that these terms of FIGS. 6-8 are only examples, and should not be construed as limiting of the scope of the disclosure.

As shown in FIG. 7, when AN2 determines that data is going to be transmitted, AN2 directly performs a data transmission, including transmitting a data unit and waiting for a feedback from UE2. Since the communication link AN2-UE2 is interfered, AN2 can not receive a feedback from UE2 or it receives a feedback indicating failure of transmission of a data unit. In this case, AN2 determines that data transmission between AN2 and UE2 is interfered. Therefore, AN2 stops performing the data transmission and begins listening to the shared channel in which the present transmission is performed. When a first communication link AN enters an idle state, AN2 will receive from UE2 a NTS indicating AN2 to transmit data. Next, AN2 will perform another data transmission within a time slot indicated in e.g. the NTS. During performing the other data transmission, if no interference is determined, AN2 then enters an idle state after the other data transmission is completed. In this regard, as shown in FIG. 7, since the first communication link AN is in a Delay state (i.e. in a waiting state) when AN2 performs the other data transmission according to the disclosure, it is necessarily determined that there is no interference at that time. Therefore, after the other data transmission is performed, AN2 enters an idle state.

Specifically, in FIG. 7, performing a data transmission by AN2 comprises performing two data transmission units each comprising a data unit (i.e. H+D) and a feedback (i.e. A). However, this is only example, and should not be construed as limiting of the scope of the disclosure. As described above, more or less data transmission units can be performed.

Reference is made to FIG. 7 again. When AN2 is in an idle state (which also means AN2 can listen to the shared channel) after performing the data transmission, UE2 may first receive a NTS indicating AN1 will transmit data in the shared channel in a closely following time slot. Then, UE2 will send a NNTS indicating delaying transmitting of data from AN2 to UE2, to notify or instruct AN2 to delay its data transmission. In an embodiment, the NNTS may further indicate when another communication link will be in idle state (i.e. indicate when AN will be in an idle state, in FIG. 7) in order to enable the communication link AN2-UE2 to perform a data transmission again. As shown in FIG. 7, after receiving the NNTS, AN2 delays transmitting of data till AN1 enters an idle state, then sends a transmitting indication NTS indicating it will transmit data. When UE2 receives the transmitting indication NTS, it'll get prepared to receive the data from AN2. When AN1 receives the transmitting indication NTS, it'll delay its data transmission to UE1. While AN1 is in a Delay state, AN2 performs a data transmission. If no interference is determined during the data transmission, AN2 enters an idle state after the data transmission is completed. Next, AN2 repeatedly performs the above steps until data is completely transmitted.

Now focus on the communication link AN of FIG. 7. Firstly, before AN2 starts transmitting of data, AN1 is repeated between performing a data transmission and entering an idle state. Then, when AN1 is in an idle state, AN1 receives from UE2 a transmitting indication NTS indicating AN2 will transmit data, and accordingly AN1 delay transmitting of data to UE1 according to a time slot indicated in the NTS, and when AN2 is in an idle state, AN1 then send a transmitting indication NTS indicating AN1 will transmit data so that AN2 will delay its data transmission to UE2. After AN1 transmits the NTS, AN1 performs a data transmission, and if no interference is determined during the data transmission, AN1 enters an idle state after the data transmission is completed. When AN1 is in an idle state, UE1 may first receive a NTS from AN2 indicating AN2 will transmit data in the shared channel in a closely following time slot. Then, UE1 will send a NNTS indicating delaying transmitting of data from AN1 to UE1. After receiving the NNTS, AN1 will delay transmitting of data to UE1 according to a time slot indicated in the transmitting indication NNTS until AN2 enters idle state. Similarly, when AN2 is in idle state, AN1 sends a transmitting indication indicating that AN1 will occupy the shared channel by transmitting data to UE1, so that the communication link AN2-UE2 will not occupy the shared channel at the same time. Next, AN1 performs another data transmission, and if no interference is determined during the other data transmission, AN1 enters an idle state. Accordingly, AN1 repeatedly performs the above steps until data is completely transmitted.

Figure 5:
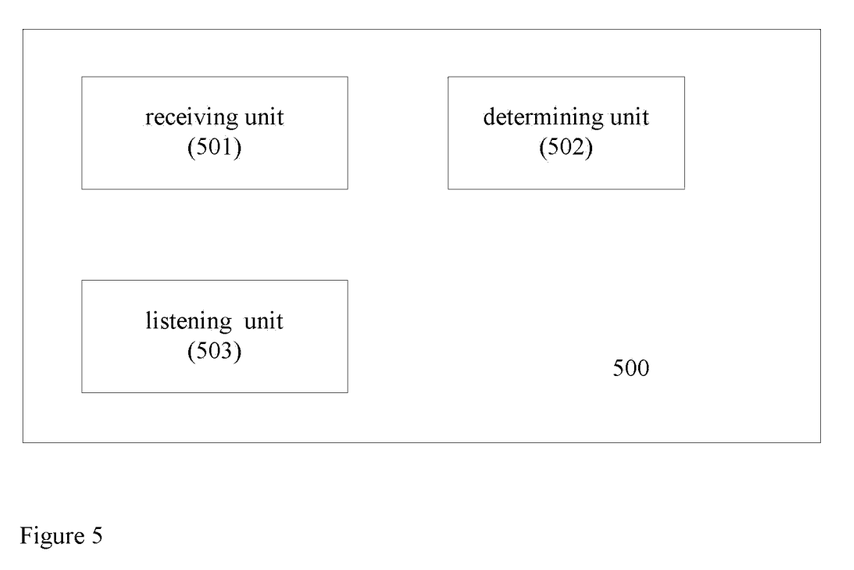
FIG. 5 schematically illustrates a block diagram of a second communication apparatus for receiving data according to an embodiment of the disclosure.

Now turning to FIG. 5, a block diagram of a second communication apparatus 500 for receiving data according to an embodiment of the disclosure is illustrated.

As shown in FIG. 5, among other things, the second communication apparatus 500 comprises a receiving unit 501 adapted to receive data from a first communication apparatus for transmitting data; a determining unit 502 adapted to determine whether the data transmission between the first communication apparatus and the second communication apparatus is interfered; and a listening unit 503 adapted to, if interference is determined, listen to a shared channel to avoid interference in receiving the data from the first communication apparatus.

In an embodiment, the receiving unit 501 can be further adapted to forward data received from the first communication apparatus to the determining unit 502 in various ways. Then the determining unit 502 can be further adapted to determine whether the data transmission between the first communication apparatus and the second communication apparatus is interfered. In an embodiment, this can be done by the second communication apparatus (i.e. the determining unit 502) determining whether received data can be decoded correctly. If the received data has been decoded correctly, then it is determined that the data transmission between the first communication apparatus and the second communication apparatus is not interfered. Otherwise, the data transmission between the first communication apparatus and the second communication apparatus is interfered. Feedback indicating whether interference exists in the present link will be sent to the first communication apparatus. If the first communication apparatus receives a feedback indicating success of transmission from the second communication apparatus before a timer (which is triggered when the first communication apparatus begins performing a data transmission) expires, then the first communication apparatus can determine the data transmission between the first communication apparatus and the second communication apparatus is not interfered, otherwise, the first communication apparatus can determine the data transmission between the first communication apparatus and the second communication apparatus is interfered. According to the disclosure, other determining method can be contemplated.

In an embodiment, the determining unit 502 can be further adapted to send a determining result to the listening unit 503 which then works depending on the determining result.

In an embodiment, the listening unit 503 can be adapted to, if no interference is determined, send to the first communication apparatus a feedback indicating success of transmission and continue receiving data from the first communication apparatus.

In an embodiment, the listening unit 503 can be adapted to, if interference is determined, listen to a shared channel to avoid interference in receiving the data from the first communication apparatus.

The listening unit 503 can be adapted to avoid interference in receiving the data from the first communication apparatus in various ways. In an embodiment, the listening unit 503 can be adapted to, during listening, if a data unit is received from a third communication apparatus within a period of time, send a transmitting indication indicating transmitting of data will be performed according to a time slot indicating in the data unit (i.e. at a time when the third communication apparatus is in an idle state), so that the first communication apparatus performs a data transmission while the third communication apparatus delays its data transmission. In an embodiment, the listening unit 503 can be adapted to: if no signal is received within a period of time, send a transmitting indication indicating transmitting of data will be performed (after the period of time elapses), in order to make the first communication apparatus performing a data transmission and the third communication apparatus delaying its data transmission. FIGS. 7 and 8 schematically illustrate the two examples of the listening unit 503 respectively.

As shown in FIG. 7, if interference is determined, UE2 begins to listen to the shared channel, and within a period of time, UE2 receives a data unit from AN1. When AN1 enters an idle state indicated in the data unit, UE2 will send a NTS indicating AN2 will perform a data transmission, to make AN2 perform a data transmission and AN1 delaying transmitting of data.

As shown in FIG. 8, if interference is determined, UE1 begins to listen to the shared channel. Within a period of time, UE1 can not receive a data unit from AN1 since the communication link AN2-UE2 is also be interfered and not transmitting data at that time. In this case, after the period of time elapses, UE1 can send a NTS indicating AN1 will transmit data, in order to make AN1 performing a data transmission later. In this case, UE2 which is also interfered can receive a data unit from AN1 to avoid interference in receiving data from AN2 as described in FIG. 7.

As shown in FIG. 8, both of the two links AN and AN2-UE2 are determined to be interfered after AN1 and AN2 simultaneously transmit a data unit without listening to a shared channel between them, which is different from FIG. 7 in which only AN2-UE2 is interfered at the beginning. In this case, each of UE1 (or AN1) and UE2 (AN2) will randomly generate a timer indicating a period of time during which it will listen to the shared channel. As shown in FIG. 8, the generated period of time of UE1 is less than that of UE2 in length, and thus the generated timer of UE1 will expire before that of UE2. In this case, UE1 will first send a NTS indicating transmitting of data will be performed, so that AN1 first try to perform a data transmission, thus making both of AN1 and AN2 be able to transmit data later according to the above methods of the disclosure.

Now return to the listening unit 503 of FIG. 5. In an embodiment, the listening unit 503 can be further adapted to: if a transmitting indication indicating transmitting of data will be performed is received from a third communication apparatus when a first communication apparatus is in an idle state, send a transmitting indication indicating transmitting of data from the first communication apparatus to the second communication apparatus will be delayed, so that the third communication apparatus will perform a data transmission and the first communication apparatus will delay performing a data transmission. For example, as shown in FIG. 7 or 8, when AN2 is in idle state, if a NTS indicating transmitting of data is received from AN1 or UE1, then UE2 will send a transmitting indication (i.e. a NNTS) indicating transmitting of data from AN2 to UE2 will be delayed, thus making AN2 delaying its data transmission.

In an embodiment, the listening unit 503 can be optionally adapted to, if interference is determined, then send to the first communication apparatus a feedback indicating failure of transmission and listen to a shared channel.

Figure 9:
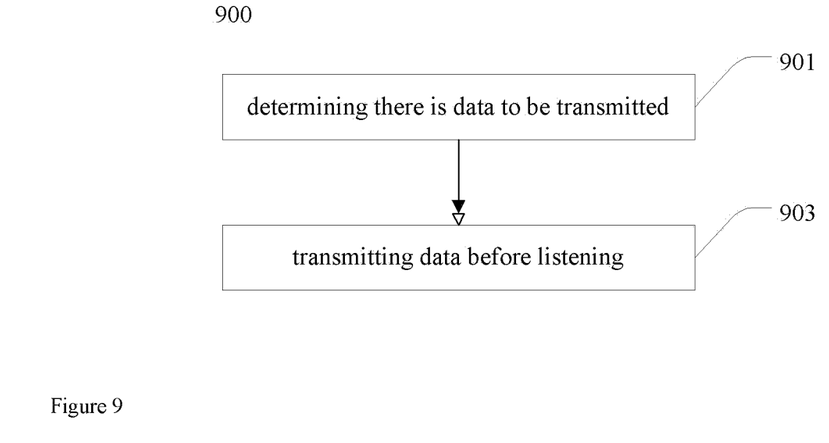
FIG. 9 schematically illustrates a method performed by a first communication apparatus for transmitting data to a second communication apparatus according to an embodiment of the disclosure.

Now reference is made to FIG. 9, a method 900 performed by a first communication apparatus for transmitting data to a second communication apparatus according to an embodiment of the disclosure is illustrated wherein the first communication apparatus and the second communication apparatus employ directional transmission, and a communication link between the first communication apparatus and the second communication apparatus shares a communication channel with another communication link comprising a third communication apparatus.

As shown in FIG. 9, the method 900 may include two steps, i.e. step 901 and step 903. In step 901, the first communication apparatus determines that there is data to be transmitted to the second communication apparatus. In step

903, the first communication apparatus transmits the data to the second communication apparatus before listening to the channel.

In an embodiment, the transmitting the data to the second communication apparatus by the first communication apparatus before listening to the channel comprises repeatedly performing the following steps until the data is completely transmitted to the second communication apparatus: performing a data transmission; and entering an idle state.

In an embodiment, the transmitting the data to the second communication apparatus by the first communication apparatus before listening to the channel comprises: performing a data transmission; and if interference is determined during the data transmission, stopping the data transmission, and listening to the channel for a transmitting indication in order to continue transmitting of data from the first communication apparatus to the second communication apparatus.

In an embodiment, the method 900 can further comprise: if during the listening, a transmitting indication from the second communication apparatus indicating transmitting of data will be performed is received, performing another data transmission; and if no interference is determined during the other data transmission, entering an idle state.

In an embodiment, the method 900 can further comprise: if during the listening, a transmitting indication from the second communication apparatus indicating transmitting of data from the first communication apparatus to the second communication apparatus will be delayed is received, delaying transmitting of data from the first communication apparatus to the second communication apparatus according to a time slot indicated in the transmitting indication, sending another transmitting indication indicating transmitting of data will be performed, performing another data transmission, and if no interference is determined during the other data transmission, entering an idle state.

In an embodiment, transmitting the data to the second communication apparatus by the first communication apparatus before listening to the channel comprises: performing a data transmission; entering an idle state; and if during the idle state, a transmitting indication from the third communication apparatus indicating transmitting of data will be performed or a transmitting indication from the second communication apparatus indicating transmitting of data from the first communication apparatus to the second communication apparatus will be delayed is received, delaying transmitting of data to the second communication apparatus according to a time slot indicated in the transmitting indication. After sending another transmitting indication indicating transmitting of data will be performed, performing another data transmission, and if no interference is determined during the other data transmission, then entering an idle state.

In an embodiment, the performing a data transmission comprises performing at least one data transmission unit within a specified time slot. In an embodiment, performing each of the at least one data transmission unit comprises: transmitting a data unit including at least a data header to the second communication apparatus; and receiving a feedback from the second communication apparatus.

Figure 10:
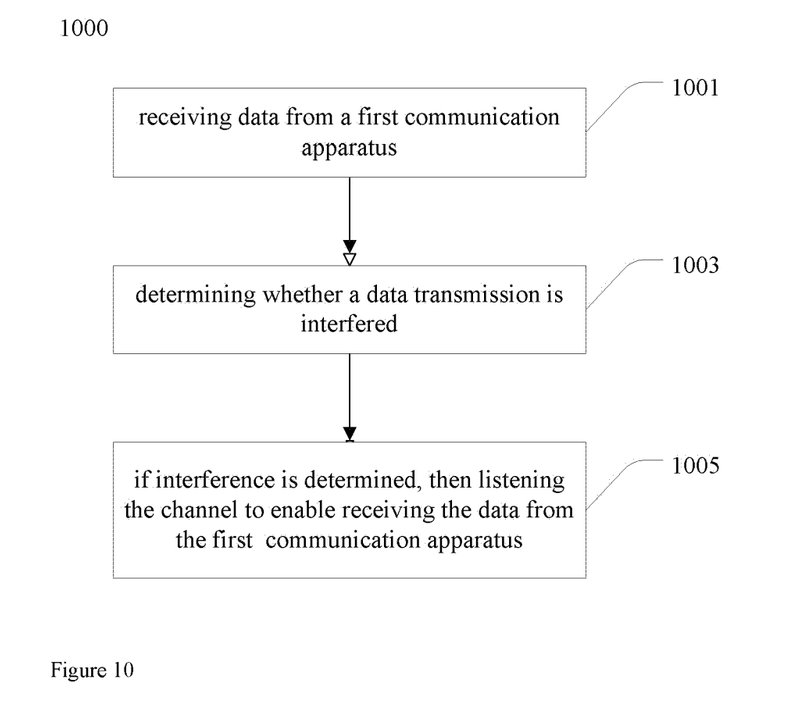
FIG. 10 schematically illustrates a method performed by a second communication apparatus for receiving data from a first communication apparatus according to an embodiment of the disclosure.

FIG. 10 schematically illustrates a method 1000 performed by a second communication apparatus for receiving data from a first communication apparatus according to an embodiment of the disclosure, wherein the first communication apparatus and the second communication apparatus employ directional transmission, and a communication link between the first communication apparatus and the second communication apparatus shares a communication channel with another communication link comprising a third communication apparatus.

As shown in FIG. 1000, the method 1000 includes three steps, i.e. step 1001, step 1003, and step 1005. In step 1001, the second communication apparatus receives the data from the first communication apparatus. In step 1003, the second communication apparatus determines whether the data transmission between the first communication apparatus and the second communication apparatus is interfered. In step 1005, the second communication apparatus listens to the channel to avoid interference in receiving the data from the first communication apparatus if interference is determined.

In an embodiment, listening to the channel to avoid interference in receiving the data from the first communication apparatus comprises: if a data unit is received from a third communication apparatus within a period of time, sending a transmitting indication indicating transmitting of data will be performed according to a time slot indicating in the data unit.

In an embodiment, listening to the channel to avoid interference in receiving the data from the first communication apparatus may comprise: if no signal is received within a period of time, sending a transmitting indication indicating transmitting of data will be performed.

In an embodiment, the method 1000 further comprises: if a transmitting indication indicating transmitting of data will be performed is received from the third communication apparatus when the first communication apparatus is in an idle state, sending a transmitting indication indicating transmitting of data from the first communication apparatus to the second communication apparatus will be delayed.

Additionally, the method 1000 further comprises: if no interference is determined, sending to the first communication apparatus a feedback indicating success of transmission, otherwise sending to the first communication apparatus a feedback indicating failure of transmission.

In an embodiment, a first communication apparatus for transmitting data according to an embodiment of the disclosure may comprise a processor and a memory. A smart phone is one example of the first communication apparatus, although the first communication apparatus could be a base station, or another appropriate type of devices. The processor is typically a microprocessor, such as that found in a personal desktop or laptop computer, a server, a handheld computer, or another kind of computing devices. The memory is a component that is capable of storing data for either the short or long term. Examples of the memory include hard disks, removable disks (including optical and magnetic disks), volatile and non-volatile random-access memory (RAM), read-only memory (ROM), flash memory, magnetic tape, etc. The memory is an example of computer-readable (or device-readable) storage media. The memory may comprise instructions which when executed by the processor causes the first communication apparatus to perform the steps as described above.

In an embodiment, a second communication apparatus for receiving data according to an embodiment of the disclosure comprise a processor and a memory. The processor and the memory are the same as that of the first communication apparatus for transmitting data. Additionally, the memory comprises instructions which when executed by the processor causes the second communication apparatus to perform the steps as described above.

According to the disclosure, the subject matter can be implemented in a computer readable storage medium having stored thereon a computer program. The computer program comprises computer program code means adapted to perform all the steps of anyone of the above-mentioned methods when the computer program is run on a computer.

It will be appreciated that the above description for clarity has described embodiments of the disclosure with reference to different functional circuits, units and processors. However, it will be apparent that any suitable distribution of functionality between different functional circuits, units or processors may be used without detracting from the disclosure. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The disclosure can be implemented in any suitable form including hardware, software, firmware or any combination of these. The disclosure may optionally be implemented at least partly as computer software running on one or more data processors and/or digital signal processors. The elements and components of an embodiment of the disclosure may be physically, functionally and logically implemented in any suitable way. Indeed the functionality may be implemented in a single unit, in a plurality of units or as part of other functional units. As such, the disclosure may be implemented in a single unit or may be physically and functionally distributed between different units, circuits and processors.

Although the present disclosure has been described in connection with some embodiments, it is not intended to be limited to the specific form set forth herein. Rather, the scope of the present disclosure is limited only by the accompanying claims. Additionally, although a feature may appear to be described in connection with particular embodiments, one skilled in the art would recognize that various features of the described embodiments may be combined in accordance with the disclosure. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A method performed by a first communication apparatus for transmitting data to a second communication apparatus in a communication channel shared with a communication link including a third communication apparatus, wherein each of the first communication apparatus, the second communication apparatus and the third communication apparatus employ directional transmission, the method comprising:
   determining there is data to be transmitted to the second communication apparatus; and
   transmitting the data to the second communication apparatus before listening to the communication channel, wherein the second communication apparatus is adapted to
   receive the data transmission from the first communication apparatus; and
   responsive to detecting interference in receiving the data transmission, listening to the communication channel to avoid interference in one or more further data transmissions from the first communication apparatus, wherein while listening to the communication channel, if a data unit is received from a third communication apparatus within a period of time, send a transmitting indication indicating transmitting of data will be performed according to a time slot indicated in the data unit.

2. The method of claim 1, wherein transmitting the data to the second communication apparatus before listening to the communication channel comprises repeatedly performing the following steps until the data is completely transmitted to the second communication apparatus:
   performing a data transmission; and
   entering an idle state.

3. The method of claim 2, wherein performing the data transmission comprises performing at least one data transmission unit within a specified time slot, and wherein performing each of the at least one data transmission unit comprises:
   transmitting the data transmission unit, including at least a data header to the second communication apparatus; and
   receiving feedback from the second communication apparatus.

4. The method of claim 1, wherein transmitting the data to the second communication apparatus before listening to the communication channel comprises:
   performing a data transmission; and
   if interference is determined during the data transmission:
   stopping the data transmission; and
   listening to the communication channel for a transmitting indication in order to continue transmitting the data from the first communication apparatus to the second communication apparatus.

5. The method of claim 4, further comprising:
   if during the listening, a transmitting indication from the second communication apparatus indicating transmitting of data will be performed is received, then performing another data transmission; and
   if no interference is determined during the other data transmission, entering an idle state.

6. The method of claim 4, further comprising:
   if during the listening, a transmitting indication from the second communication apparatus indicating transmitting of the data from the first communication apparatus to the second communication apparatus will be delayed is received:
   delaying transmitting of the data from the first communication apparatus to the second communication apparatus according to a time slot indicated in the transmitting indication;
   sending another transmitting indication indicating transmitting of the data will be performed;

performing another data transmission; and
if no interference is determined during the other data transmission, entering an idle state.

7. The method of claim 1, wherein transmitting the data to the second communication apparatus before listening to the communication channel comprises:
performing a data transmission;
entering an idle state; and
if during the idle state, a transmitting indication from the third communication apparatus indicating transmitting of data will be performed or a transmitting indication from the second communication apparatus indicating transmitting of the data from the first communication apparatus to the second communication apparatus will be delayed is received, then:
delaying transmitting of the data from the first communication apparatus to the second communication apparatus according to a time slot indicated in the transmitting indication;
sending another transmitting indication indicating transmitting of the data will be performed;
performing another data transmission; and
if no interference is determined during the other data transmission, then entering an idle state.

8. A first communication apparatus configured for transmitting data to a second communication apparatus in a communication channel shared with a communication link including a third communication apparatus, wherein each of the first communication apparatus, the second communication apparatus and the third communication apparatus employ directional transmission, the first communication apparatus comprising:
a processor; and
a memory, wherein the memory comprises instructions that, when executed by the processor, cause the first communication apparatus to:
determine there is data to be transmitted to the second communication apparatus; and
transmit the data to the second communication apparatus before listening to the communication channel, wherein the second communication apparatus is adapted to:
receive the data transmission from the first communication apparatus; and
responsive to detecting interference in receiving the data transmission, listening to the communication channel to avoid interference in one or more further data transmissions from the first communication apparatus, wherein while listening to the communication channel, if a data unit is received from a third communication apparatus within a period of time, send a transmitting indication indicating transmitting of data will be performed according to a time slot indicated in the data unit.

9. The first communication apparatus of claim 8, wherein the memory comprises instructions that cause the first communication apparatus to repeatedly perform the following steps until the data is completely transmitted to the second communication apparatus:
perform a data transmission; and
enter an idle state.

10. The first communication apparatus of claim 9, wherein the memory comprises instructions that cause the first communication apparatus to perform the data transmission by performing at least one data transmission unit within a specified time slot, wherein performing each of the at least one data transmission unit comprises:
transmitting the data transmission unit, including at least a data header to the second communication apparatus; and
receiving feedback from the second communication apparatus.

11. The first communication apparatus of claim 8, wherein the memory comprises instructions that cause the first communication apparatus to:
perform a data transmission; and
if interference is determined during the data transmission:
stop the data transmission; and
listen to the communication channel for a transmitting indication in order to continue transmitting of the data from the first communication apparatus to the second communication apparatus.

12. The first communication apparatus of claim 11, wherein the memory comprises instructions that cause the first communication apparatus to:
if during the listening, a transmitting indication from the second communication apparatus indicating transmitting of data will be performed is received, then perform another data transmission; and
if no interference is determined during the other data transmission, enter an idle state.

13. The first communication apparatus of claim 11, wherein the memory comprises instructions that cause the first communication apparatus to:
if during the listening, a transmitting indication from the second communication apparatus indicating transmitting of data from the first communication apparatus to the second communication apparatus will be delayed is received, then:
delay transmitting of the data from the first communication apparatus to the second communication apparatus according to a time slot indicated in the transmitting indication;
send another transmitting indication indicating transmitting of the data will be performed;
perform another data transmission; and
if no interference is determined during the other data transmission, enter an idle state.

14. The first communication apparatus of claim 8, wherein the memory comprises instructions that cause the first communication apparatus to transmit the data to the second communication apparatus before listening to the communication channel by:
performing a data transmission;
entering an idle state; and
if during the idle state, a transmitting indication from the third communication apparatus indicating transmitting of data will be performed or a transmitting indication from the second communication apparatus indicating transmitting of the data from the first communication apparatus to the second communication apparatus will be delayed is received, then:
delaying transmitting of the data from the first communication apparatus to the second communication apparatus according to a time slot indicated in the transmitting indication;
sending another transmitting indication indicating transmitting of the data will be performed;
performing another data transmission; and
if no interference is determined during the other data transmission, then entering an idle state.

15. A second communication apparatus configured for receiving data from a first communication apparatus in a communication channel shared with a communication link including a third communication apparatus, wherein each of the first communication apparatus, the second communication apparatus and the third communication apparatus employ directional transmission, the second communication apparatus comprising:
- a processor; and
- a memory, wherein the memory comprises instructions that, when executed by the processor, cause the second communication apparatus to:
  - receive a data transmission from the first communication apparatus;
  - responsive to detecting interference in receiving the data transmission, listening to the communication channel to avoid interference in one or more further data transmissions from the first communication apparatus; and
- while listening to the communication channel, if a data unit is received from a third communication apparatus within a period of time, send a transmitting indication indicating transmitting of data will be performed according to a time slot indicated in the data unit.

16. The second communication apparatus of claim 15, wherein the memory comprises instructions that cause the second communication apparatus to:
   if no signal is received within a period of time, send a transmitting indication indicating transmitting of data will be performed.

17. The second communication apparatus of claim 15, wherein the memory comprises instructions that cause the second communication apparatus to:
   if a transmitting indication indicating transmitting of data will be performed is received from the third communication apparatus when the first communication apparatus is in an idle state, send a transmitting indication indicating transmitting of the data from the first communication apparatus to the second communication apparatus will be delayed.

18. The second communication apparatus of claim 15, wherein the memory comprises instructions that cause the second communication apparatus to:
   send, if no interference is determined, to the first communication apparatus feedback indicating success of transmission; otherwise, send to the first communication apparatus feedback indicating failure of transmission.

* * * * *